United States Patent
Gardiner et al.

(10) Patent No.: US 10,049,520 B2
(45) Date of Patent: Aug. 14, 2018

(54) ACCESS SYSTEM WITH PERSISTENT DISPLAY

(71) Applicant: Sargent Manufacturing Company, New Haven, CT (US)

(72) Inventors: William Gardiner, New Haven, CT (US); Andrew Wilding, Bristol, CT (US)

(73) Assignee: SARGENT MANUFACTURING COMPANY, New Haven, CT (US)

( * ) Notice: Subject to any disclaimer, the term of this patent is extended or adjusted under 35 U.S.C. 154(b) by 0 days.

(21) Appl. No.: 15/620,135

(22) Filed: Jun. 12, 2017

(65) Prior Publication Data

US 2017/0358160 A1    Dec. 14, 2017

Related U.S. Application Data

(60) Provisional application No. 62/349,437, filed on Jun. 13, 2016.

(51) Int. Cl.
*G07C 9/00* (2006.01)
*G06F 3/147* (2006.01)
*E05B 17/22* (2006.01)

(52) U.S. Cl.
CPC ......... *G07C 9/00944* (2013.01); *G06F 3/147* (2013.01); *G07C 9/00174* (2013.01); *G07C 9/00571* (2013.01); *E05B 17/226* (2013.01); *G07C 2009/00642* (2013.01); *G07C 2209/62* (2013.01)

(58) Field of Classification Search
CPC ............ G07C 9/00944; G07C 9/00174; G07C 9/00571; E05B 17/226; E05B 41/00
USPC .................................................. 340/5.7–5.74
See application file for complete search history.

(56) References Cited

U.S. PATENT DOCUMENTS

| 6,337,618 | B1 | 1/2002 | Craig et al. | |
|---|---|---|---|---|
| 8,628,057 | B2* | 1/2014 | Sakata | H01M 8/2465 251/230 |
| 9,847,020 | B2* | 12/2017 | Davis | G08C 23/04 |
| 2013/0081434 | A1 | 4/2013 | Grant et al. | |

FOREIGN PATENT DOCUMENTS

EP    2963620 A1    1/2016

OTHER PUBLICATIONS

European Patent Office; International Search Report and Written Opinion for International Application No. PCT/US2017/037000 dated Sep. 22, 2017, 16 Pages.

(Continued)

*Primary Examiner* — Allen T Cao
(74) *Attorney, Agent, or Firm* — Dennis J. Williamson; Moore & Van Allen PLLC

(57) ABSTRACT

An electronic entry device such as a door lock includes a display that uses substantially no power when a static image is presented. Such a display can be "always on" and be used to display information to users of the entry device on a continuous basis. In some embodiments, the persistent display is an e-ink display. In some embodiments, the persistent display may present a scannable code, such as a QR code, that is statically displayed on the persistent display when a new product is unboxed. The persistent display can also present weather, news, scheduling, or other information.

19 Claims, 12 Drawing Sheets

(56) References Cited

OTHER PUBLICATIONS

Assa Abloy Inc.; "IN120 WiFi Access Control Lock," Downloaded from the Internet May 25, 2016, <http://www.intelligentopenings.com/en/site/intelligentopenings/solutions/corporate/in120/>, 3 Pages.

Kastrenakes, Jacob; "This E Ink tablet is a cute way to manage meetings," The Verge, 2016, 2 Pages.

Corbin Russwin, Inc.; "IN120 Series: Intelligent WiFi Access Control," 2013, 20 Pages.

* cited by examiner

ACCESS SYSTEM WITH PERSISTENT DISPLAY

CROSS-REFERENCE TO RELATED APPLICATION

This application claims priority from commonly owned, provisional patent application Ser. No. 62/349,437, filed Jun. 13, 2016, the entire disclosure of which is incorporated herein by reference.

BACKGROUND

Local area network (LAN) communications between various systems and devices is ubiquitous. Existing electronic infrastructures in large, modern commercial buildings have been commonly outfitted with devices compatible with the Ethernet standards, including those for power-over-Ethernet (PoE), 100 Base-T, 10 Base-T, and other similar protocols. Ethernet interfaces can be found in devices such as IP telephones, wireless LAN access points, network cameras, building automation devices, security devices and the like. Other buildings, such as, for example, smaller buildings, residences, very old buildings, and buildings constructed with minimal expenditure often do not have ubiquitous wiring and rely on wireless LAN communications to connect devices.

The physical security industry has responded by providing "smart" door locks and other entry devices which connect to a network wirelessly. Such devices can also be used where it is cumbersome or undesirable to run wiring through door frames and doors. Since these devices are not connected to wiring, they are powered by batteries. The batteries are changed at regular intervals. A device such as a smart lock is therefore designed to shut down portions of the device that are not used for long intervals. For example, most smart locks are designed to shut off the display when the lock has not been used for a time. In order for a user to view information on the display, the user must interact with the smart lock in some way so that the display "wakes up." When the display is shut off information is not communicated from the display.

SUMMARY

Embodiments of the invention implement an electronic entry device or access system such as a door lock. The access system according to embodiments of the invention includes a display that uses substantially no power when a static image is being displayed. Such a display can thus be "always on" and be used to display information and/or messages to users of the access system that would normally be left for simple low-power indicator lights, printed placards, or physical labels.

An access system according to at least some embodiments includes a lock mechanism, and a persistent display for information, wherein the persistent display requires substantially no power to display a static image. The access system according to some embodiments also includes a memory, and at least one controller connected to the lock mechanism and/or persistent display, the memory and the memory cause the persistent display to present the information as at least a portion of the static image.

In some embodiments, the persistent display is or includes an e-ink or e-paper display. In some embodiments, the at least one controller includes a persistent display controller. In some embodiments, the access system also includes a lock controller operatively connected to the persistent display controller. In some embodiments, the persistent display controller is configured to monitor the locking mechanism where signals from the lock controller determine the information to present on the persistent display. In some embodiments, one controller is configured to provide both persistent display control functions and lock control functions.

In some embodiments, the access system includes an interface to an electronic access control (EAC) system. The access system can receive scheduling information through the EAC system, for example, calendar information from a personal information manager (PIM). The EAC system can also provide information from external sources to the access system for persistent display, such as weather data and/or news.

In some embodiments, various graphics and/or information can be stored in a memory associated with the controller(s) and persistent display of the access system. Such information can include a scannable code, for example a QR code, that is statically displayed on the persistent display when the access system hardware is packaged. The code is associated with informational material regarding the installation and/or initialization of the access system so that when a new product is unboxed, the consumer or installer can scan the code and receive or review the informational material.

An access system according to example embodiments operates by presenting a static image on a persistent display that requires substantially no power to display the static image, receiving a signal indicative of content for the static image, determining the content based on the signal, and updating the static image as appropriate based on the determination. In addition to a scannable code, weather, and scheduling information for a premise protected by the door lock, the access system can display information about the electronic door lock itself, such as diagnostics, information about installed firmware, and battery status. An access system according to example embodiments can also display information about the present and/or future status of a premise secured by the electronic door lock, such as the premise occupancy status or that an occupant should not be disturbed.

In some embodiments of the invention, a computer program product includes a tangible medium having non-transitory computer program code embodied thereon for operating the access system or door lock. The computer program instructions may be provided for the controller or controllers, which execute and thus create means for implementing the functions/acts necessary to carry out an embodiment of the invention. The computer program code may include not only instructions, but also API commands, EAC commands, and images such as the scannable code displayed when a new lock is unboxed, and any other data necessary to support the access system. The tangible medium may be a memory in an actual locking device, or storage on which the computer program product resides for manufacturing or update purposes.

DETAILED DESCRIPTION

Figure 1:
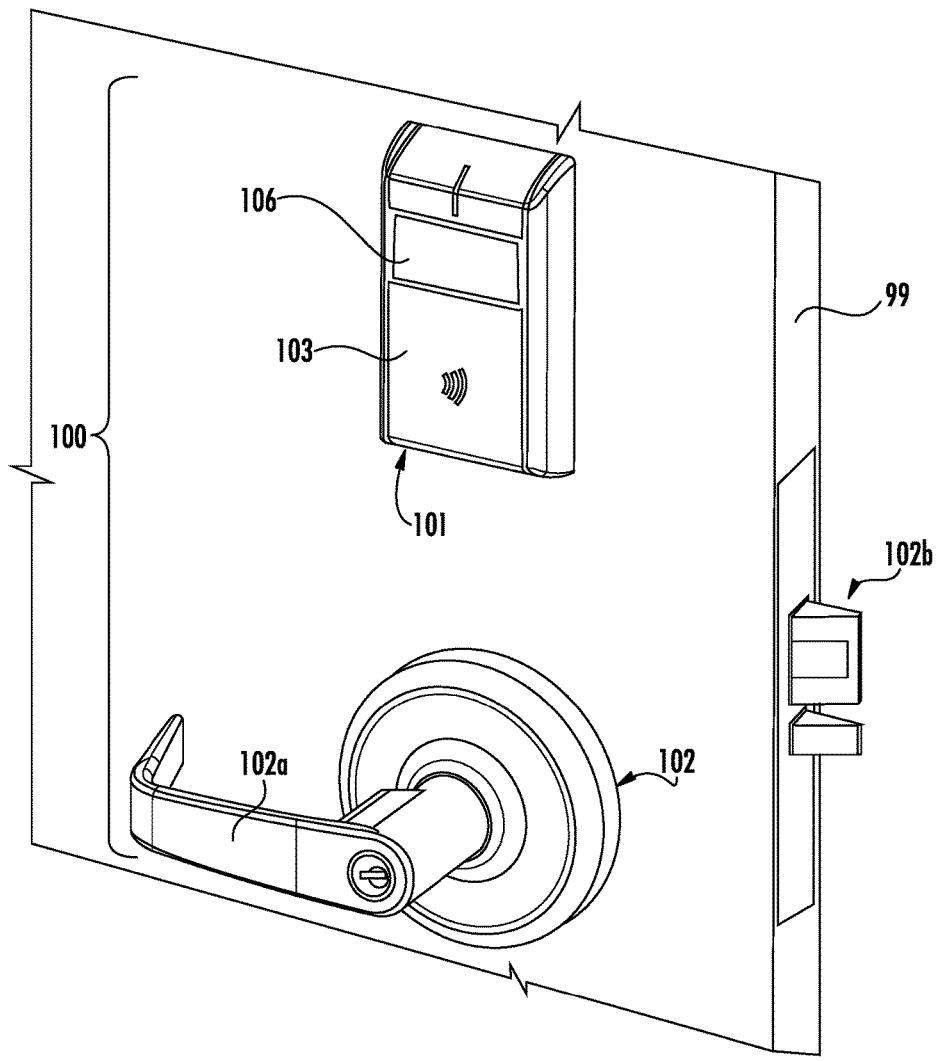
FIG. 1 depicts a perspective view of an access system (a lock) according to example embodiments of the invention.

The following detailed description teaches specific example embodiments of the invention. Other embodiments do not depart from the scope of the present invention. It will be understood that when an element is referred to as being "connected" or "coupled" to another element, it can be directly connected or coupled to the other element or intervening elements may be present, and any or all of the connections can be mechanical, electrical, wires or wireless.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. Unless otherwise expressly stated, comparative, quantitative terms such as "more" and "greater," are intended to encompass the concept of equality. As an example, "more" can mean not only "more" in the strictest mathematical sense, but also, "greater than or equal to."

As will be appreciated by one of skill in the art, the present invention may be embodied as a method, device, article, system, computer program product, or a combination of the foregoing. Any suitable computer usable or computer readable medium may be utilized for a computer program product to implement all or part of an embodiment of the invention. The computer usable or computer readable medium may be, for example but not limited to, a tangible electronic, magnetic, optical, electromagnetic, or semiconductor system, apparatus or device. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), a portable compact disc read-only memory (CD-ROM), or an optical storage device. The computer usable or computer readable medium may be one or more fixed disk drives or flash drives deployed in servers or access systems, forming a "cloud" or network. This latter arrangement can be especially useful for deploying firmware or other code for field updates or manufacturing.

Computer program code for carrying out operations of the present invention or for assisting in the carrying out of a method according to an example embodiment of the invention may be written in an object oriented, scripted or unscripted programming language such as Java, Perl, python, C++ or the like. However, the computer program code for carrying out operations of the present invention may also be written in conventional procedural programming languages, such as the "C" programming language or similar programming languages. The computer program code may also be written in HTML5 or similar languages that are commonly used for applications or "apps" intended to be run on mobile computing devices such as smart phones, tablets, smart watches, music players, and the like.

Computer program instructions may be provided to a processor of a general purpose computer, special purpose computer, server, workstation, mobile device or other programmable data processing apparatus to produce a machine, such that the instructions, which execute via the processor of the computer or other programmable data processing apparatus, create means for implementing the functions/acts necessary to carry out an embodiment of the invention. Computer program instructions may also be provided as firmware for an embedded controller or a plurality of embedded controllers.

Embodiments of the invention can implement an electronic access system or entry device such as a door lock. The access system can include computer program code which, when executed by a processor, causes the access system to perform the methods of embodiments of the invention. A computer program product can include a medium with non-transitory computer program code that when executed causes the access system to perform the method according to an embodiment of the invention. The access system according to embodiments of the invention includes a display that uses substantially no power when a static image is being displayed. Such a display can thus be "always on" and be used to display information and/or messages to users of the entry device that would normally be left for simple low-power indicator lights, or printed placards or labels. Such a display can be referred to as a "persistent" display or a "continuous" display. Such terminology is not meant to suggest that the display is not addressable by electronics or a processor to display an infinite variety of images. Rather, what is meant is that once the display is updated to present a particular static image, power is not required for the image to remain on the display for very long periods, or possibly indefinitely. However, at some future time, the display may be programmatically updated again to display different image.

Terms such as "image" and "information" are intended in their broadest sense. An image may include graphics, text, symbols, skeuomorphs, etc. The text in an image maybe graphically created through of bitmap by the external source, or by electronics that are part of the display in response to standard textual information embedded in messaging. Likewise, information sent from a server or retrieved over a network, and then displayed on a persistent display as an image, can include symbols, graphics, text, representations of data, and the like.

Figure 16:
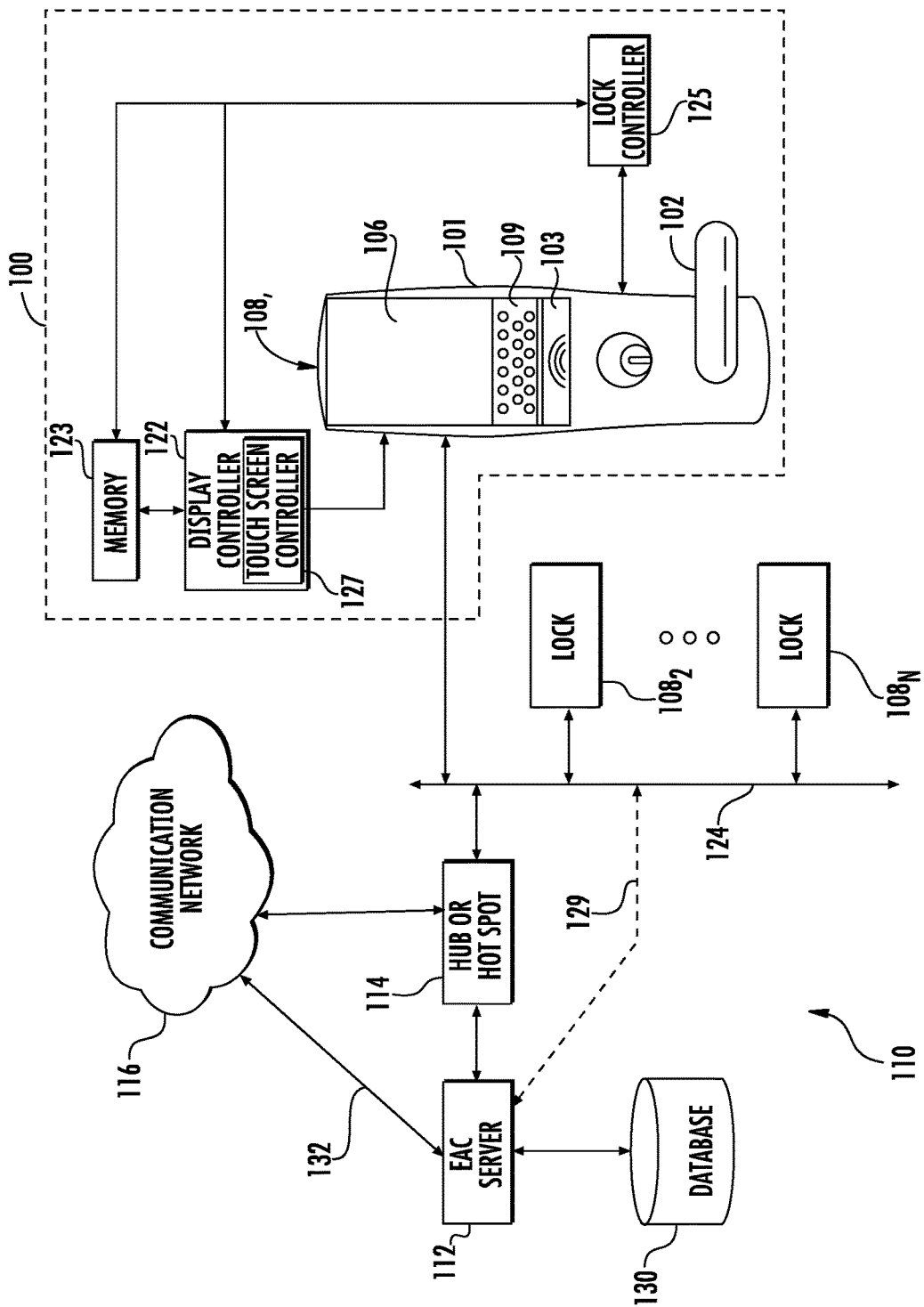
FIG. 16 is a network diagram illustrating the operating environment of a plurality of locks with persistent displays according to example embodiments of the invention with one of the locks enlarged and shown in detail for clarity.

FIG. 1 depicts an access system 100 used to verify the identity of a person who desires entry to a door 99 secured by locking mechanism 102. The access system 100 may include a control module and display 101 and a locking mechanism 102. Both the control module and display 101 and the locking mechanism 102 together can also be referred to as a "lock" and in fact these two mechanisms can be sold and installed together, and may even be physically connected as shown in FIG. 16. The locking mechanism 102 may comprise a handle 102a that is operatively connected to a latch bolt 102b that engages and disengages a mating bolt hole on a door jam. The handle 102a may be manipulated to extend and retract the latch bolt 102b as is known. The locking mechanism 102 may take a variety of forms and configurations and may include, for example, a deadbolt knob and dead bolt latch and/or other locking mechanisms and actuators. The control module and display 101 and the locking mechanism 102 together may be referred to herein as an access system, entry device, locking system or lock.

Referring to FIG. 16, locks of the type illustrated in FIG. 1 can typically communicate with a server 112 in addition to communicating with a device placed near the lock to verify access credentials, such as an access card, fob, or mobile device via reader 103. RFID, NFC, or another similar technique can be used for access. The lock may comprise a lock controller 125 for controlling operation of the locking mechanism 102 and communicating with the display controller 122. The lock controller 125 and/or the display controller 122 may communicate with the server 112 via interface 124. In some embodiments the lock controller 125 and the display controller 122 may be a single physical component or the functionality may be distributed between multiple components. The lock further comprises memory 123, such as for example a flash memory, that may be accessed by the lock controller 125 to provide computer readable instructions that may be used by the lock controller to control operation of the locking mechanism 102. The control module and display 101 may further include a display controller 122 that can access memory 123. The display controller 122 is configured to control the display of information on the persistent display 106. The display controller 122 may also receive inputs from and transmit inputs to the display where the display has touch screen capability. The memory 123 may be accessed by the display controller 122 to provide computer readable instructions that may be used by the display controller to control operation of the display 106. A dedicated memory may be provided for the lock controller 125 and the display controller 122 or the memory 123 may be shared with the display controller 122 as shown in FIG. 16.

As used herein, a controller generally refers to a device or combination of devices having circuitry used for implementing the communication and/or logic functions of a particular system. For example, a controller may include a digital signal processor device, a microprocessor, and/or microcontroller and other support circuits and/or combinations of the foregoing. Control and signal processing functions of the system are allocated between these processing devices according to their respective capabilities. The controller may further include functionality to operate one or more software programs based on computer-executable program code thereof, which may be stored in a memory 123. As the phrase is used herein, a controller may be "configured to" perform a certain function in a variety of ways, including, for example, by having one or more general-purpose circuits perform the function by executing particular computer-executable program code embodied in computer-readable medium, and/or by having one or more application-specific circuits perform the function In at least some embodiments of the present invention, the broader electronic access control (EAC) system 110 comprises a server 112, a hub or hot spot 114, and a plurality of locks $108_1$ to $108_N$, each including a reader for an access card, fob, or mobile device to be used to verify identity can gain access. Locks $108_1$ to $108_N$ can be coupled to the server 112 via Wi-Fi, Bluetooth, or some other wireless networking protocol via interface 124 using hub or hot spot 114. Locks $108_1$ to $108_N$ could also be coupled to the server 112 by wired connections 129, such as an Ethernet cable that passes through a hinge of the door. These interfaces may include or be implemented by a communication network 116 such as an actual local area network, by a virtual local area network, and/or by a WAN over some great distance. The network may comprise the public communications network and/or the Internet. In the latter case, the Internet might be used and a secure "pipe" or "tunnel" might be established between the locks or a lock and the server. The server 112 may reside on the Internet. Even though the interfaces are often bi-directional interfaces, the interfaces may be implemented as unidirectional interfaces that use a unidirectional communication protocol, for example, the Wiegandz protocol. The server 112 may access a database 130 in order to access computer readable instructions to implement the invention.

The control module and display 101 includes a built-in persistent display 106. The persistent display is "always-on" and uses substantially no electrical power when the image on the display is static. In one example embodiment, the display is implemented by "e-paper" or "e-ink" display technology, like that used in some mobile e-readers. As used herein the terms persistent display, e-ink display and e-paper display mean display devices that are capable of holding and displaying static images indefinitely without using power. An e-ink display provides a set of pixels that can be bit-addressed as a matrix of ones and zeros. Thus, data for preset screen displays can be stored in memory 123 within a lock and accessed by controller 122. A library access interface to data and/or code that provides general electronic access control can be used, with commands translated as necessary. The display can also include a capacitive or other type of touch sensitive layer so that it also serves as a touch-screen 109 for gesture input. For example, the display can be made to present a keypad, which a user can then touch to enter an access code. The display in FIG. 1 is installed in the landscape orientation while the display in FIG. 16 is installed in the portrait mode.

Figure 17:
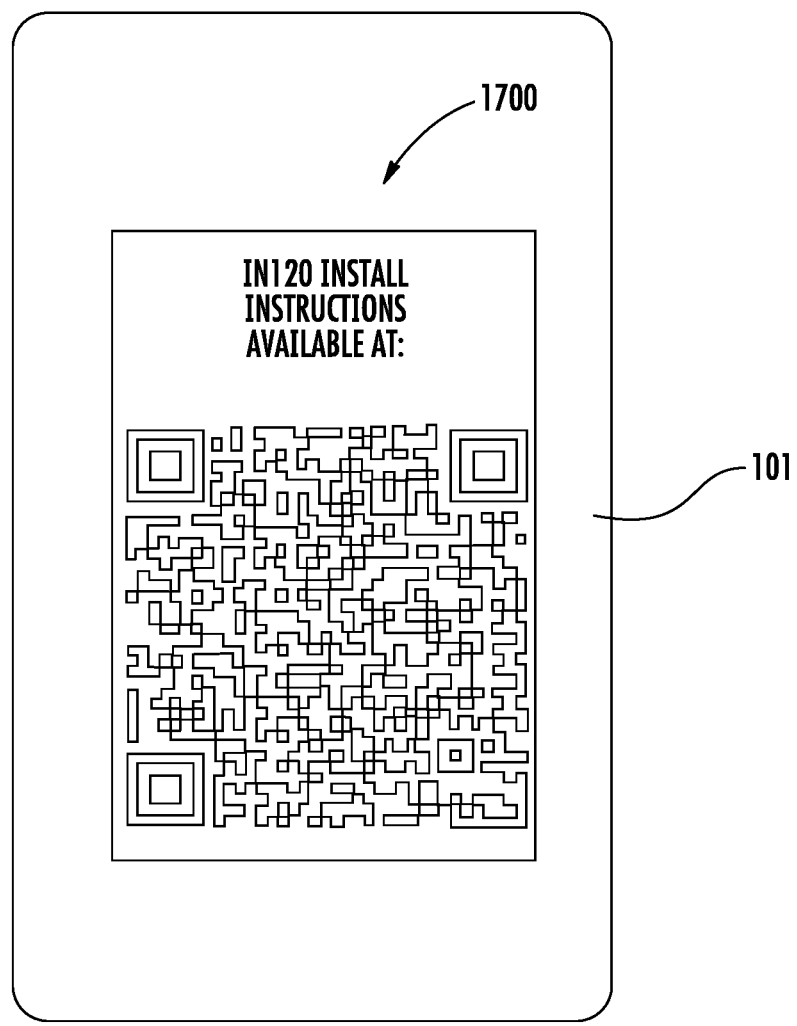
FIG. 17 is an example image on a persistent display that may be used to provide access to installation instructions.

Because the screen does not use any power if it is not changing, a lock or display portion of a lock can be packaged with the screen displaying an image that is useful during set-up and/or installation of the lock. For example, the screen can be packaged displaying a QR code or bar code as shown at display 1700 in FIG. 17 that, when scanned, leads a smartphone or similar computing device to installation instructions, a directory of installers for hire, or the like such as on the manufacturer's web page. Because the display 106 is a persistent display the image of the QR code or bar code 1700 may be programmed to be displayed by the manufacturer and be permanently displayed until the user installs and/or initializes the lock.

Figure 2:
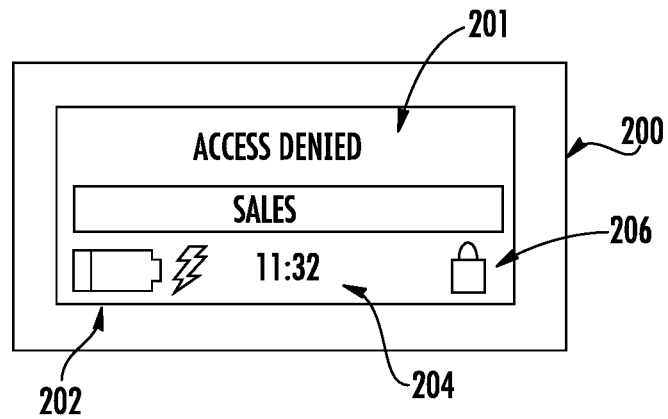
FIG. 2, FIG. 3, FIG. 4, FIG. 5, FIG. 6, FIG. 7, FIG. 8, and FIG. 9 each depict an example image on the persistent display of the access system of FIG. 1.

Because the persistent display 106 can be always-on, as opposed to LCD and LED displays often included in locks of the prior art, which need to be shut down or put to sleep when not in use to conserve power, a wide range of valuable information can be displayed for extended periods of time. FIG. 2 illustrates a display 200, where the main message 201 being statically displayed, "access denied," pertains to the status of the premise or room that is being protected by the lock. Display 200 is also statically displaying information about the electronic door lock itself, such as battery level icon 202, the current time 204 recorded within the device, and a lock status icon 206 indicative of the status of the locking device 102.

Figure 3:
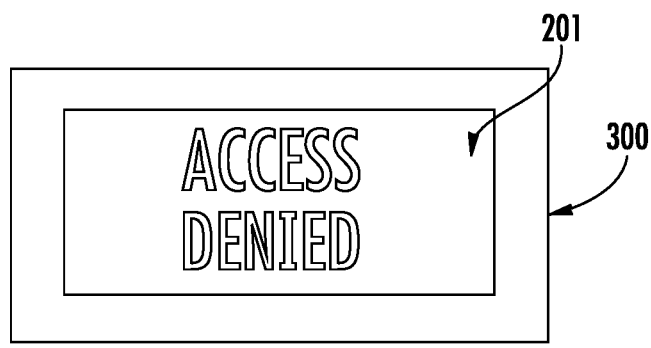
Figure 4:
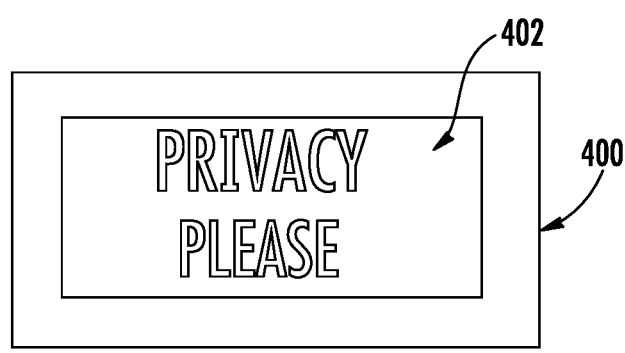
Figure 5:
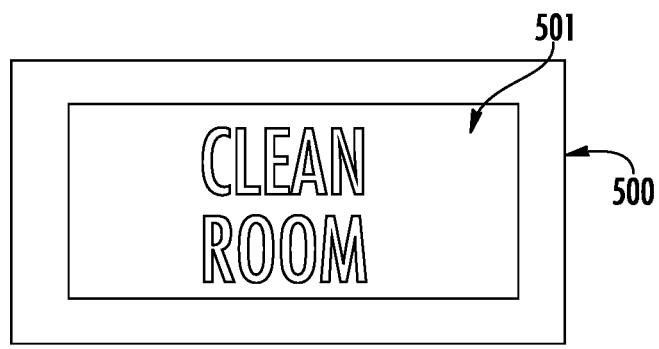
Figure 6:
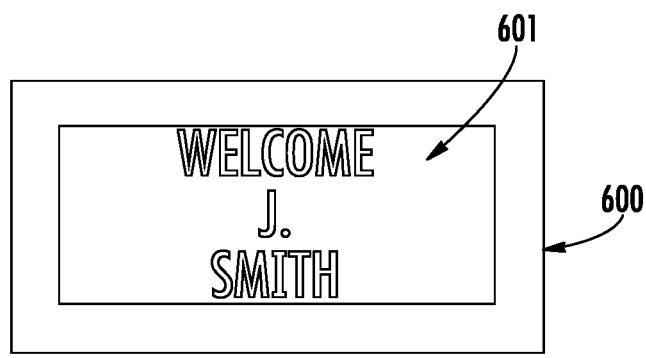
Figure 7:
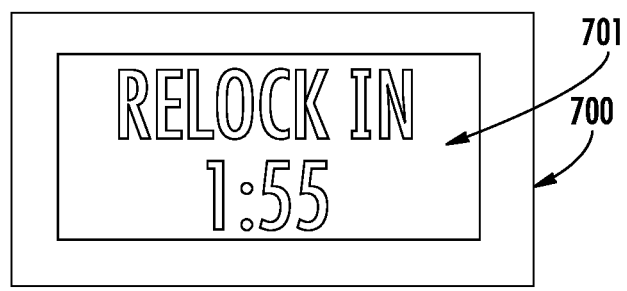
Figure 8:
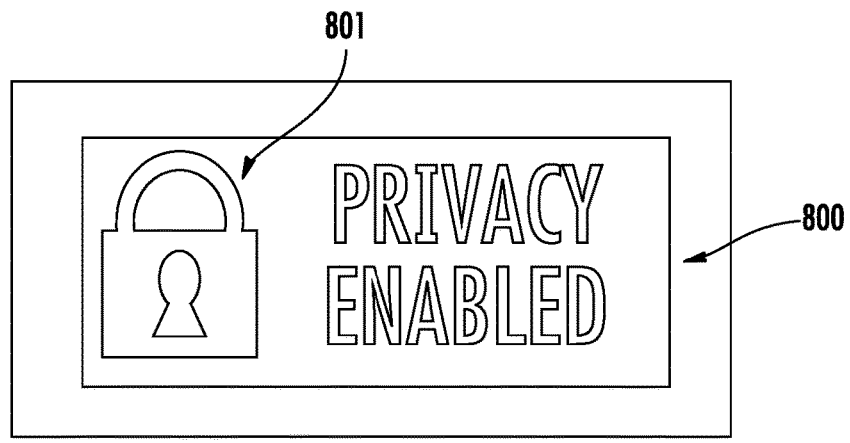
Figure 9:
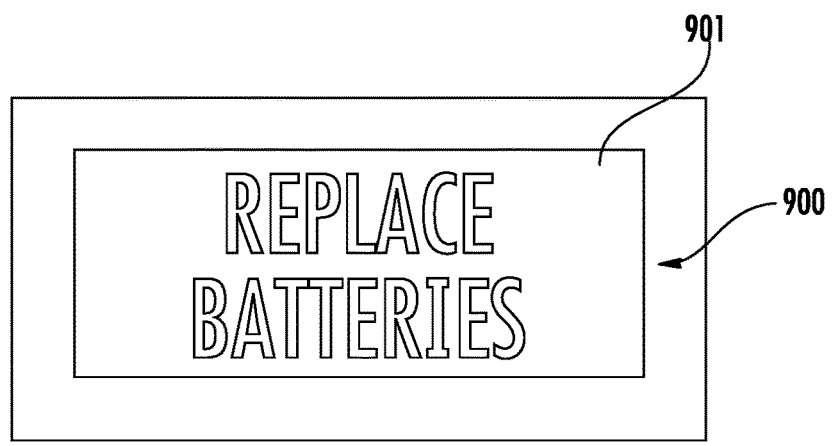

FIG. 3 illustrates a display 300, which is statically displaying only the main message 201 from FIG. 2, pertaining to the status of the room or premise that is being protected by the lock. FIG. 4 illustrates a display 400 which is statically displaying information 402 that privacy is desired that may be input into the access system by the occupant of the room protected by the access system. FIG. 5 shows a display 500 which is statically displaying a request 501 to have the premise cleaned such as by a housekeeping service that may be input into the access system by the occupant of the room protected by the access system. Such a display maybe useful if the access system is being used on premises such as a hotel or resort. Display 600 of FIG. 6 is statically displaying a message 601 that could be considered information about the future status of the premise that may be input into the access system by the access system operator. In particular, the message is directed at a future guest. FIG. 7 illustrates display 700 which is statically displaying information about the status of the door lock 701, namely that it will relock within a certain time period. Display 800 of FIG. 8 is statically displaying information pertaining to the status of the lock 801, that privacy has been enabled for the particular lock. Display 900 of FIG. 9 is statically displaying information 901 pertaining to the status of the lock, namely that the batteries need to be replaced. The images and information shown and described herein are made by way of example only and the images and information statically displayed may include other images and information and various different combinations of images and information.

Figure 10:
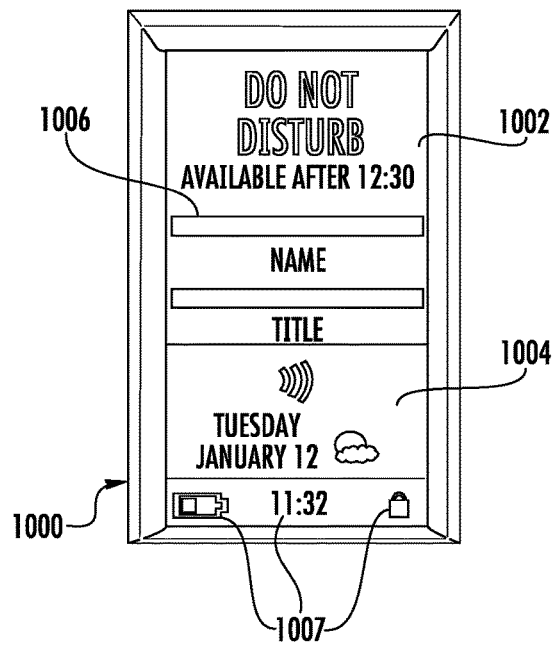
FIG. 10 and FIG. 11, each depict an example image on another embodiment of persistent display.
Figure 11:
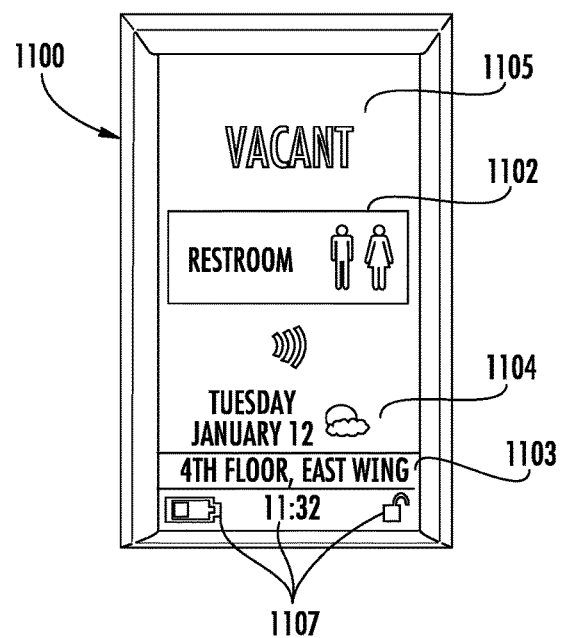

FIG. 10 and FIG. 11 illustrate an embodiment where the persistent display is larger and in a portrait orientation. Referring to FIG. 16, with a touch-screen-based display, the display controller 122 may comprise a touch-screen controller 127 or a plurality of controllers that provide both output interface functions and input interface functions for the user. The touch-screen controller 122 receives/sends electrical signals from/to the touch screen 109. The touch screen 109 displays visual output to the user. The visual output may include text, graphics, video, and any combination thereof as previously described. Some or all of the visual output may correspond to user-interface objects, which may be skeuomorphs, such as representation of keys in the form of a keypad. The touch screen accepts input from the user based on haptic contact. The touch screen and the touch screen controller can detect contact, changes in the contact area, or a break of contact with the touch screen and convert the detected contact into interaction with user-interface objects.

It should also be noted that regardless of display size, if the system is connected to a server that has access to the Internet, or the Internet itself, external information can be displayed for the convenience of users. FIG. 10 and FIG. 11 include examples of such a display. FIG. 10 includes display 1000, which is statically displaying scheduling information 1002 received through the EAC system, which in turn may receive the information from a personal information manager (PIM), such as Microsoft Outlook™. The scheduling information may be obtained via a network connection, from an individual's personal information manager, such as Microsoft Exchange Server™, and use this information to display availability or scheduling information. The same can be done for an access system for a conference room or meeting hall if scheduling information for the facility is kept on-line. As another example, current weather information is statically displayed in area 1004 of the display 1000 of FIG. 10. The frequency of updating of such information can be programmatically set to balance power consumption with the need for fresh information depending on the type of information being displayed. Display 1000 also is statically displaying identification information 1006 of the occupant of the space protected by the access system. Other information regarding the status of the lock are also shown in static display 1000, such as battery, current clock time information and lock status 1007.

FIG. 11 illustrates static display 1100 which is statically displaying the type of premise 1102 being protected, as well as its location 1103 and status 1105. Display 1100 also is statically displaying weather information 1104 as previously described. Screen 1100 is also statically displaying time, battery status, and lock status information 1107 like that already discussed. Other current external information could also be statically displayed such as news, traffic information for the local area or the like.

Figure 12:
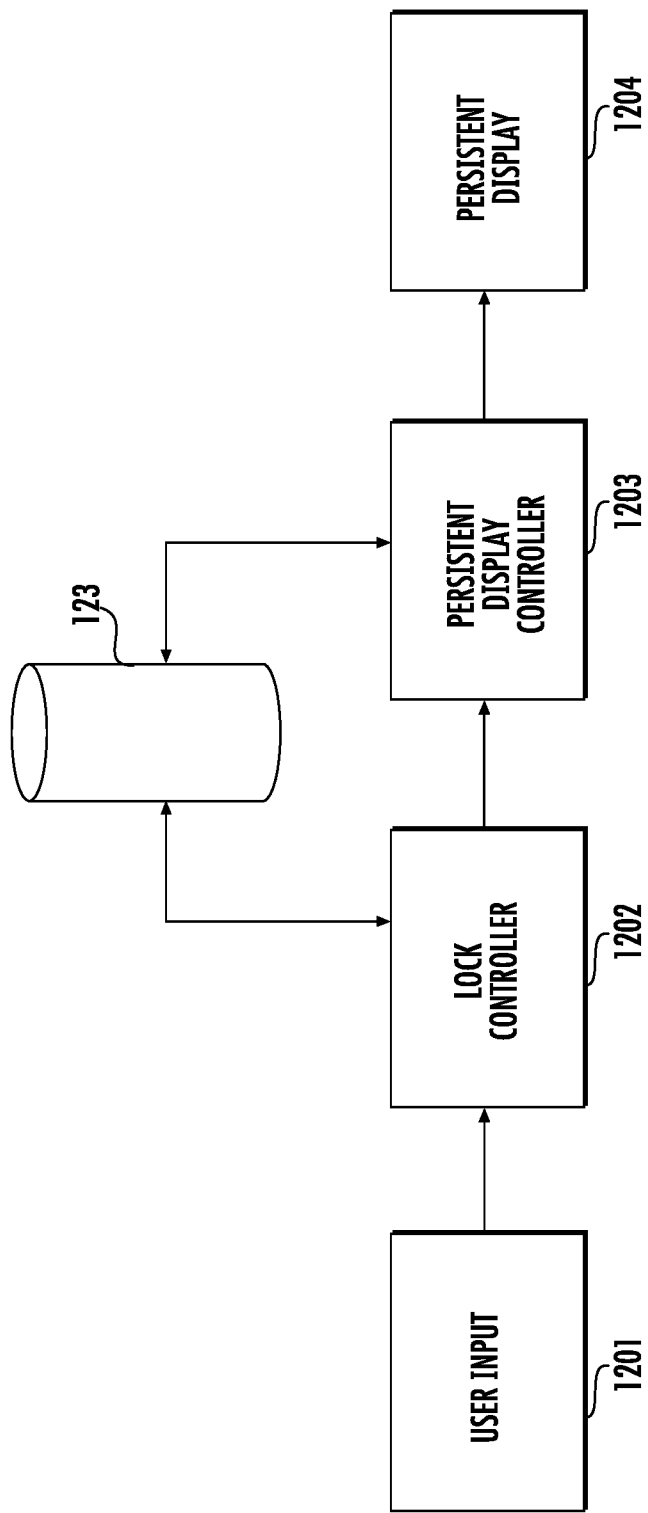
FIG. 12, FIG. 13, FIG. 14, and FIG. 15 are schematic block diagrams illustrating the architecture of an access system according to example embodiments of the invention.
Figure 13:
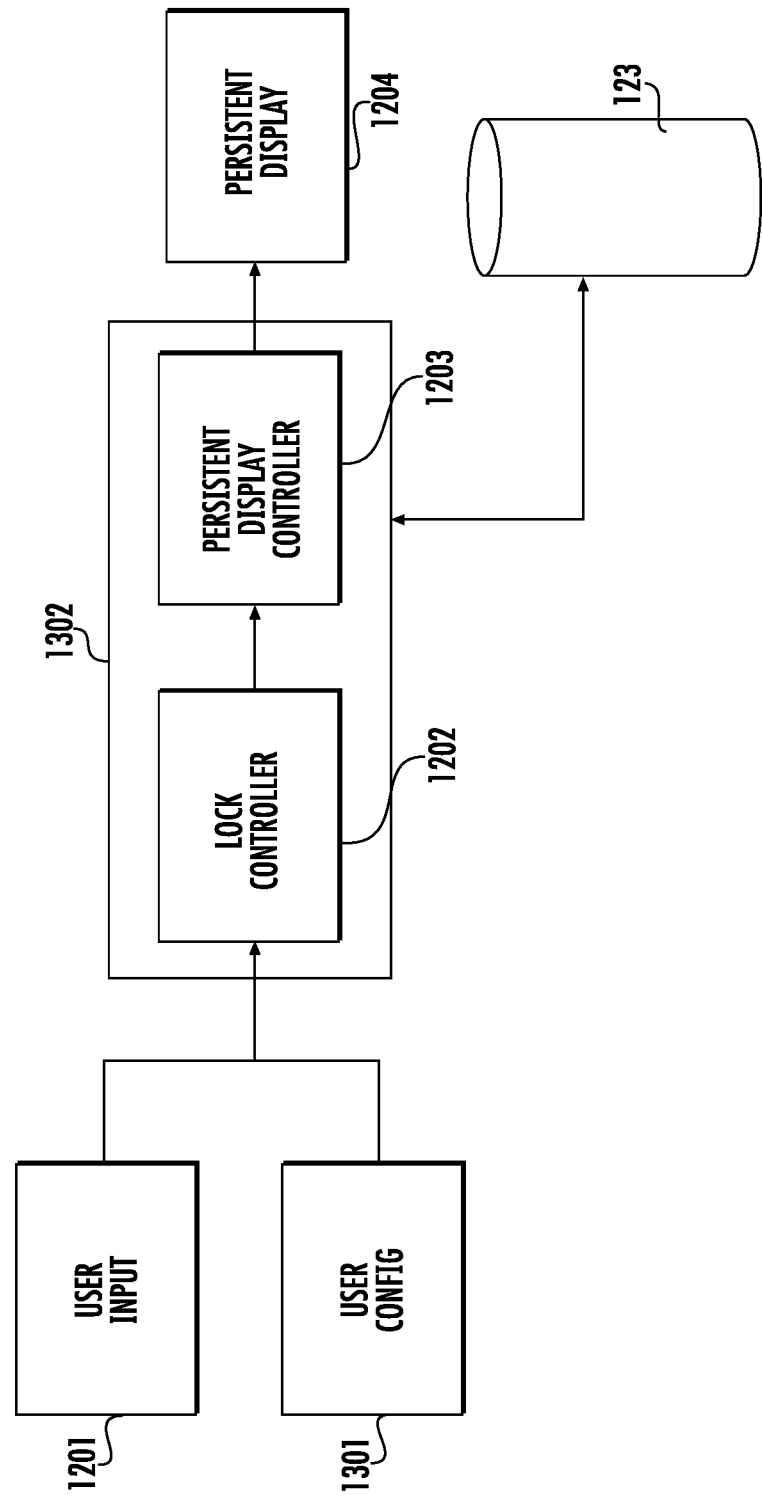
Figure 14:
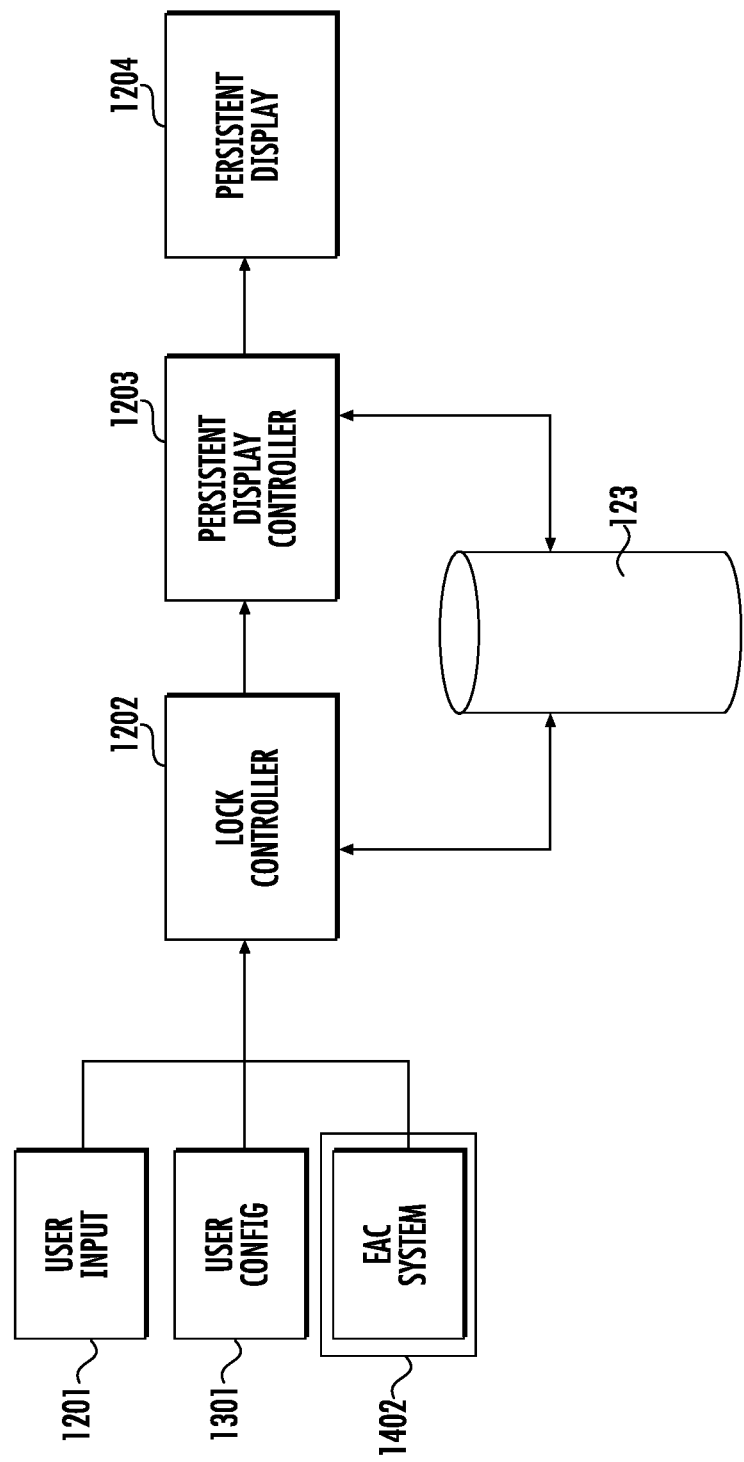
Figure 15:
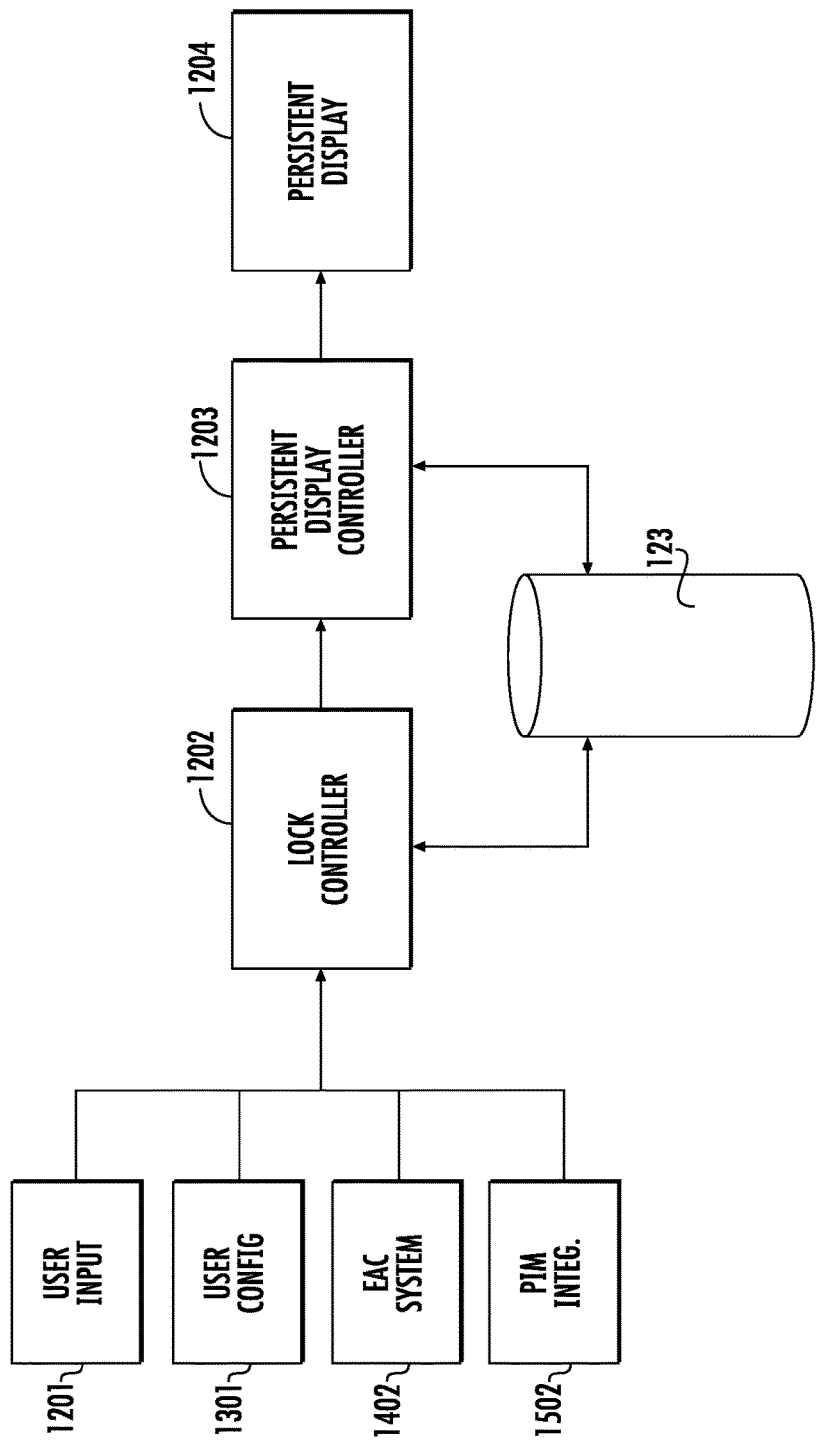

FIG. 12 is a hardware block diagram of some example embodiments of the invention. In operation, a user provides input 1201 to the lock controller 1202, such as an unlock action or setting the lock to privacy mode. The user may use an entry device such as a key fob or key card or the touch screen capability to provide the use input. The persistent display controller 1203 is tied to signal outputs from the lock controller 1202 based on this action. The persistent display 1204 may then change to produce a different display output depending on what action was performed. In FIG. 13, the interface between the lock controller 1202 and the persistent display controller 1203 within block 1302 is upgraded to allow the lock controller 1202 to directly drive the persistent display 1204 instead of the persistent display controller 1203 acting upon generic output signals. This capability allows the user to generate custom configurations that can be implemented through user configuration software or firmware 1301. FIG. 14 is a block diagram of an access control system where the user's electronic access control system (EAC system) 1402 can send data to the persistent display 1204 in the form of a command set that the EAC sends to the lock controller 1202. The lock controller 1202 then sets the persistent display 1204 accordingly. FIG. 15 illustrates the integration of personal information management functions into the access system. For purposes of this disclosure, Microsoft Exchange™ is assumed to be accessible via interface 1502 for the presenting of Outlook™ calendar information on the persistent display itself. The persistent display could therefore integrate when certain rooms or people might be available.

Figure 18:
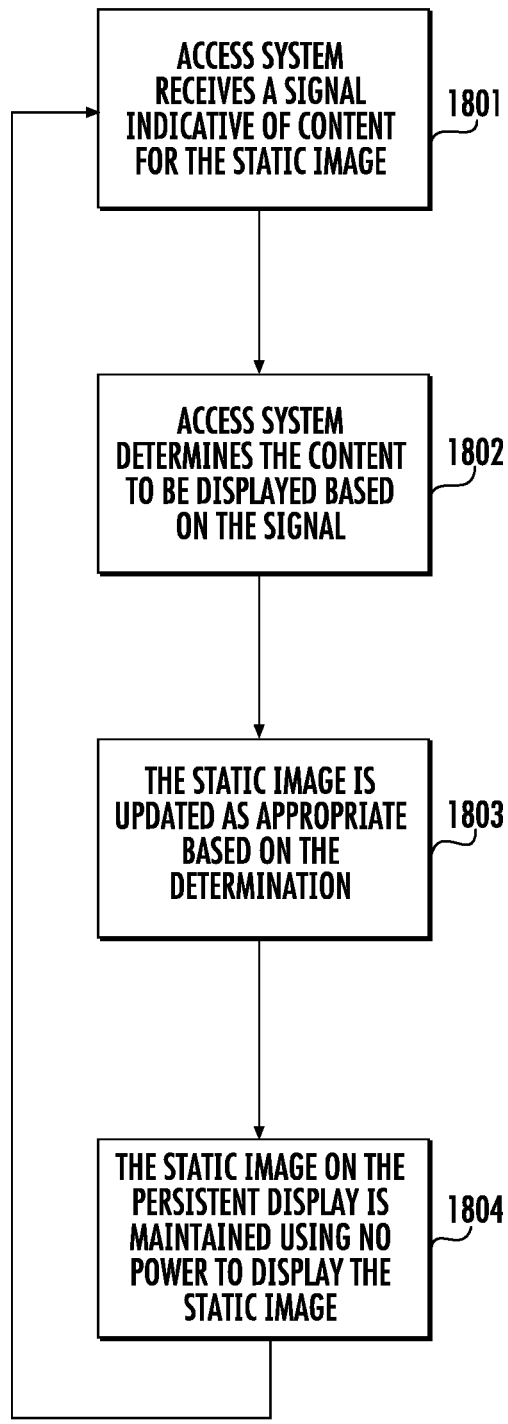
FIG. 18 is a flowchart illustrating an example method of operating an access system according to the embodiments illustrated in the previous figures.

Referring to FIG. 18 an embodiment of a method of operating the access system according to example embodiments operates by presenting a static image on a persistent display that requires substantially no power to display the static image. The access system receives a signal indicative of content for the static image (block 1801). The signal may comprise a lock signal from a lock controller, a command from an application programming interface (API) library for the persistent display, a command input by a touch screen on the display 106 and/or a command from an electronic access control (EAC) system. The access system determines the content to be displayed based on the signal (block 1802). The content may comprise for example, but is not limited to, any of the content previously described. The static image is updated as appropriate based on the determination (block 1803). The static image on the persistent display is maintained using no power to display the static image (block 1804).

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. An access system comprising:
a locking mechanism;
a persistent display for information, wherein the persistent display does not require power to maintain a display of a static image;
a memory; and
at least one controller connected to the locking mechanism, the memory and the persistent display to cause the persistent display to present the information as at least a portion of the static image, and
computer program code executed by the at least one controller, the computer program code comprising user configuration computer program code that receives a user generated signal from the persistent display to configure the information displayed on the persistent display.

2. The access system of claim 1 wherein the persistent display further comprises an e-ink display.

3. The access system of claim 2 wherein the at least one controller further comprises an e-ink controller.

4. The access system of claim 3 wherein the at least one controller further comprises a lock controller connected to the e-ink controller.

5. The access system of claim 4 wherein the e-ink controller is configured to monitor locking mechanism signals from the lock controller to determine the information to present.

6. The access system of claim 2 wherein the at least one controller is configured to provide both e-ink control functions and lock control functions.

7. The access system of claim 2 further comprising an interface to an electronic access control (EAC) system.

8. The access system of claim 2 wherein the memory further comprises a scannable code associated with material regarding the installation and/or initialization of the access system, the scannable code statically displayed at the initialization of the access system.

9. The access system of claim 1 wherein the persistent display displays user-interface objects comprising at least a touch screen keypad.

10. A method of operating an electronic door lock, the method comprising:

presenting a static image on a persistent display that does not require power to maintain a display of the static image;

receiving a signal indicative of content of the static image wherein the content comprises information about a status of a premise secured by the electronic door lock, the status being unrelated to the status of the door lock;

determining the content based on the signal; and updating the static image based on the determining of the content.

11. The method of claim 10 wherein the signal comprises a lock signal from a lock controller.

12. The method of claim 10 wherein the signal comprises at least one command from an application programming interface (API) library for the persistent display.

13. The method of claim 10 wherein the signal comprises at least one command from an electronic access control (EAC) system.

14. The method of claim 10 wherein the content comprises scheduling information.

15. The method of claim 14 where in the scheduling information comprises information from a personal information management (PIM) system.

16. The method of claim 10 wherein the content comprises a scannable code associated with information regarding installation and/or initialization of the electronic door lock.

17. The method of claim 10 wherein the content comprises information about the electronic door lock.

18. A method of operating an electronic door lock having a locking mechanism; a persistent display for displaying information; a memory; and at least one controller connected to the locking mechanism, the memory and the persistent display to cause the persistent display to present the information as at least a portion of the static image, and computer program code executed by the at least one controller, the method comprising:

prior to initialization and installation of the electronic door lock, presenting a static image on a persistent display that does not require power to maintain a display of a static image wherein the static image comprises information regarding installation and/or initialization of the electronic door lock;

using the information from the static image to install and initialize the door lock.

19. The method of claim 18 wherein the information comprises a scannable code.

* * * * *